Patented Nov. 14, 1939

2,179,806

UNITED STATES PATENT OFFICE 2,179,806

MANUFACTURE OF HYDRATED SODIUM TETRASILICATE

Walter F. Wegst, Philadelphia, and John H. Wills, Brookhaven, Chester, Pa., assignors to Philadelphia Quartz Company, Philadelphia, Pa., a corporation of Pennsylvania

REISSUED

No Drawing. Application November 18, 1936, Serial No. 111,556

9 Claims. (Cl. 23—110)

This invention relates to manufacture of hydrated sodium tetrasilicate; and it comprises, as a new product, the compound $Na_2O.4SiO_2$ in hydrated crystalline form; said product occurring in the form of white, fluffy crystals having a diameter ranging from about 1 to 10 microns and containing about 7 molecules of water of crystallization. The invention further comprises processes of manufacturing said hydrated sodium tetrasilicate comprising seeding concentrated sodium silicate solutions of high silica ratio with seed crystals of said tetrasilicate and advantageously maintaining said solutions at elevated temperatures favoring crystal growth and under conditions of agitation; all as more fully hereinafter set forth and as claimed.

While several crystalline hydrates of sodium metasilicate and at least one crystalline hydrate of sodium sesquisilicate have been reported in the literature, up until the time of the present invention no crystalline hydrates containing more than 2 moles of $SiO_2$ to 1 mole of $Na_2O$ have been isolated at ordinary temperatures. In the phase rule system consisting of $Na_2O$, $SiO_2$ and $H_2O$, our knowledge of the field which includes high silica ratios is very limited.

We have now discovered a new crystalline hydrate having a ration of $Na_2O$ to $SiO_2$ of 1 to 4 and containing in the neighborhood of 7 molecules of water of hydration. We have further found methods of preparing this compound and have developed various uses to which it may be put.

The new compound can be prepared from concentrated solutions of sodium silicate having high ratios of silica. It is best formed at elevated temperatures although it can be prepared at a slower rate at ordinary temperatures or below. The rate of formation is greatly accelerated by heating and by agitation. Increased temperatures reduce the viscosity of the sodium silicate solutions and this may account for the increased speed of crystal formation.

It has been found somewhat difficult to promote spontaneous formation of the tetrasilicate crystals. Our experiments indicate that spontaneous formation can be accomplished, with a small yield of crystals, in a period of two or more months, if a solution containing 11 per cent $Na_2O$ and 32 percent $SiO_2$ is agitated and heated to temperatures of about 75° to 85° C. over such a period of time. We have found that it usually requires several years for the spontaneous formation of tetrasilicate crystals to occur in the same solution standing at room temperatures. When seed crystals are added to solutions capable of growing the crystals, however, propagation can be accomplished at a reasonable rate of speed provided operating conditions are properly chosen.

Our experiments indicate that the tetrasilicate crystals can be grown in any concentrated liquid silicate solution of high silica ratio containing the proper proportion of water and advantageously having a ratio of $Na_2O$ to $SiO_2$ ranging from about 1:2 to 1:11 or above. Best results have been obtained when the $SiO_2$ in this ratio has been above 2.4. The amount of water present should not exceed about 75 to 80 per cent by weight. As examples of solutions which are capable of growing crystals of the new tetrasilicate, there may be mentioned the following six sodium silicate solutions which have been employed in practice in growing tetrasilicate crystals, these solutions containing $Na_2O$ and $SiO_2$ in the percentages by weight as indicated: (1) 6.0% $Na_2O$, 23.6% $SiO_2$; (2) 6.3% $Na_2O$, 22.9% $SiO_2$; (3) 8.3% $Na_2O$, 24.0% $SiO_2$; (4) 9.4% $Na_2O$, 23.8% $SiO_2$; (5) 11.0% $Na_2O$, 26.6% $SiO_2$; (6) 13.7% $Na_2O$, 32.9% $SiO_2$. The percentages of water in these solutions can be found by subtracting the percentages of $Na_2O$ and $SiO_2$ from 100%. Our experiments indicate that temperatures ranging from about 0° to 100° C. can be employed in growing tetrasilicate crystals although we have obtained best results within the narrower range of from about 60° to 90° C.

In preparing the tetrasilicate crystals it is merely necessary to prepare a suitable sodium silicate solution, to add seed crystals thereto and then to allow the solution to stand for a sufficient length of time either at room temperatures or above. The growth of the crystals can be accelerated by heating the solution to temperatures somewhat below 90° C. and by agitation. The optimum crystallizing temperature appears to be between about 75° and 85° C. but even at this temperature it usually requires several days for the seed crystals to double in weight. The resulting magma of crystals may be separated from the mother liquor by filtration or by the use of a centrifuge, for example, and then washed with water. Since the crystals dissolve very slowly at ordinary temperatures they may be washed thoroughly if cold water is used. The crystals should then be dried at temperatures which are advantageously below 80° C., since under ordinary conditions they lose water rather rapidly above this temperature.

In order to dry the crystals rapidly they may be washed with any convenient water-soluble volatile solvent which will not react with the crystals. Alcohol followed by ether may be used although our experiments show that alcohol reacts to some extent with the crystals to form a gel coating. Upon analysis of crystals washed with alcohol a silica ratio above 1 to 4 is obtained which indicates the presence of this gel coating.

The tetrasilicate crystals are usually obtained in extremely finely divided form. When examined under a low power microscope it is difficult to distinguish the shape of the crystals although their birefringence is plainly noticeable. The crystals usually vary in diameter from about 1 to 10 microns. When examined as to their optical properties it has been found that the crystals are either uniaxial or, if biaxial, $\beta$ and $\gamma$ are practically identical. The elongation is $\gamma$, extinction parallel. $\alpha$ equals $1.463\pm.003$. $\gamma$ equals $1.483\pm.003$.

The crystals are stable in their mother liquor for periods of longer than one month when frozen in ice. They are also stable in solutions kept at 85° C. and have been kept at 95° for five hours with only partial solution. The mother liquor used in these particular tests analyzed 9.38 per cent $Na_2O$, 25.41 per cent $SiO_2$ and 65.16 per cent $H_2O$.

Our experiments show that the tetrasilicate crystals lose water on heating, even at fairly low temperatures. When dried at 62° C. for example, they retain from about 13 to 17 per cent of water. Heated at 80° C. there is an additional loss of a little over 1 per cent of water. After drying at 100° C. there is somewhat less than 6 per cent of water remaining, while at 320° C. there still remains about 1.5 per cent of water. These experiments indicate the existence of several hydrates of the composition $Na_2O.4SiO_2.xH_2O$, having transition points lying between the temperatures of 0° to 200° C. or above. The present invention provides methods of preparing such hydrates.

In obtaining proof of the chemical composition of the new crystals, several different methods of analysis were employed. Employing the so-called "inert material method" for estimating the amount of mother liquid mixed with the crystals, we used sodium chloride as the inert material. In one analysis by this method we found the molecular ratios of $Na_2O:SiO_2:H_2O$ to be 1:3.97:7.00, while in a second test, in which a larger quantity of mother liquor was mixed with the crystals, we obtained ratios of 1:4.09:7.57. Since the latter results included a greater experimental error due to the larger amount of mother liquor, the former values of the ratios are probably the more nearly correct. A direct analysis of the crystals, after washing with water to free them from mother liquor, gave a ratio of $Na_2O$ to $SiO_2$ of 1:4.00.

The above results were also checked by the so-called wet residue method of Schreinemaker, described in Z. Physikal. Chem. 11, 76 (1893). In these tests four sodium silicate solutions of different composition were prepared and tetrasilicate crystals were grown in each. The mother liquors and the wet residua of crystals were then analyzed. These data were then used, according to the method of Schreinemaker, to estimate the percentages of $Na_2O$ present in the dry crystals. The results obtained for the four solutions gave percentages of 14.09%, 14.18%, 13.91%, and 14.30%, respectively, for the $Na_2O$ present in the dry crystals. This compares with a theoretical value of 14.47% $Na_2O$ for the compound $Na_2O.4SiO_2.7H_2O$.

The above data are believed to show rather conclusively that the crystals of the present invention are the tetrasilicate, $Na_2O.4SiO_2.7H_2O$. The molecular ratio of the $Na_2O$ to $SiO_2$, of course, has been established with greater certainty than the moles of water present in the compound.

In one specific embodiment of the process of the present invention we took 29 kilograms of a silicate of soda solution containing 11 per cent $Na_2O$ and 33 per cent of $SiO_2$. We seeded this solution with a magma of crystals of tetrasilicate recovered from a previous operation weighing 3.25 kilograms and containing 22 per cent crystals, i. e. 715 grams dry weight. This solution was stirred at high speed and maintained at a temperature of 80° C. for 24 hours. The tetrasilicate crystals were recovered from this solution, washed and dried, with a yield of 1,199 grams, representing 484 grams, dry weight, of crystals grown. There was a loss of weight by evaporation of the solution amounting to about 10 per cent. The liquid silicate going into the formation of the crystals amounted to 1.55 per cent.

In another operation we took 21 kilograms of the same silicate of soda solution and added a crystal sludge weighing 3.83 kilograms or 843 grams of crystals, dry weight. This mixture was agitated, but at a slower rate than in the preceding example, for a period of 7 days while the temperature was maintained at 70° C. In this case the dry weight of the crystals grown was 149 grams. The loss by evaporation amounted to about 10 per cent and the liquid silicate forming the crystals amounted to 0.6 per cent.

Our new tetrasilicate has characteristics which adapt it to many uses. Some of the uses for which it appears particularly adapted are as follows:

(1) As an ingredient for enamels adapted to provide silica in a readily fluxible form to make possible a high silica content in the enamel without release of gas.
(2) As an ingredient of cements and concretes where a slowly soluble silica is desirable as a hardening agent, or where silica in more reactive form than pure quartz is required.
(3) As a means of purifying silicates and of obtaining highly silicious silicates in pure form without the cost and danger of contamination inherent in the fusion process, and having the advantage of a fine state of sub-division without the need of grinding and consequent contamination from that source.
(4) As a finely-divided product which combines abrasive and cleansing properties either alone or as an ingredient of cleansing compositions.

It is likewise evident that the tetrasilicate can be employed in making up silicate solutions, that caustic soda can be added to these solutions to vary the ratio of $Na_2O$ to $SiO_2$ and that the resulting solutions can be employed for all the various uses which have been suggested previously for silicate solutions of similar compositions.

While we have described what we consider to be the best embodiments of our invention it will be obvious to those skilled in the art that various modifications can be made in the procedure outlined. Our new tetrasilicate can be prepared over a considerable range of conditions or, more specifically, over those ranges of temperature, concentration, pressure, etc. from which the compound $Na_2O.4SiO_2.7H_2O$ will separate as a solid phase in contact with mother liquor, as understood under the principles of the phase rule. Modifications of our method which fall within the scope of the following claims we consider to be part of our invention.

What we claim is:

1. A product occurring in the form of fluffy, white crystals having a diameter ranging from about 1 to 10 microns; said crystals having a molecular ratio of $Na_2O$ to $SiO_2$ of 1 to 4 and containing approximately 7 molecules of water.

2. A crystalline product whose crystals are either uniaxial or, if biaxial, $\beta$ and $\gamma$ are practically identical, whose elongation is $\gamma$, extinction parallel and wherein $\alpha$ equals $1.483\pm.003$, and $\gamma$ equals $1.483\pm.003$; said crystals having a molecular ratio of $Na_2O$ to $SiO_2$ of 1 to 4 and containing approximately 7 molecules of water.

3. In the process of manufacturing crystalline silicates, the step which comprises seeding a sodium silicate solution, containing more $SiO_2$ than is represented by the molecular ratio of $1Na_2O$ to $2SiO_2$ and containing not substantially more than about 75 per cent of water, with crystals having a molecular ratio of $Na_2O$ to $SiO_2$ of 1 to 4 and containing approximately 7 molecules of water.

4. The process which comprises seeding a concentrated sodium silicate solution, having a molecular ratio of $SiO_2$ to $Na_2O$ above about 2 to 1, with crystals having a molecular ratio of $Na_2O$ to $SiO_2$ of 1 to 4 and containing approximately 7 molecules of water, and heating said solution within a temperature range of from about 60° to 90° C. for a time sufficient to grow said crystals.

5. The process which comprises adding crystals, having a molecular ratio of $Na_2O$ to $SiO_2$ of 1 to 4 and containing approximately 7 molecules of water, to a concentrated sodium silicate solution containing $SiO_2$ in amount greater than that represented by the molecular ratio of $1Na_2O$ to $2SiO_2$ and agitating the solution while maintaining conditions favorable for the growth of said crystals.

6. The process which comprises adding crystals, having a molecular ratio of $Na_2O$ to $SiO_2$ of 1 to 4 and containing approximately 7 molecules of water, to a concentrated sodium silicate solution containing $SiO_2$ in amount greater than that represented by the molecular ratio of $1Na_2O$ to $2SiO_2$, agitating said solution and heating it to temperatures below about 100° C. for a time sufficient to grow said crystals.

7. The process which comprises adding crystals, having a molecular ratio of $Na_2O$ to $SiO_2$ of 1 to 4 and containing approximately 7 molecules of water, to a sodium silicate solution having a ratio of $Na_2O$ to $SiO_2$ ranging from about 1:2.4 to 1:11 and maintaining said solution within the temperature range of about 75° to 85° C. and under conditions of agitation for a time sufficient to grow said crystals.

8. The process which comprises heating a sodium silicate solution containing $SiO_2$ in amount greater than that represented by the molecular ratio of $1Na_2O$ to $2SiO_2$ to temperatures ranging from about 60° to 90° C. under conditions of agitation for a time sufficient to grow crystals having a molecular ratio of $Na_2O$ to $SiO_2$ of 1 to 4 and containing about 7 molecules of water.

9. The process which comprises heating crystals, having a molecular ratio of $Na_2O$ to $SiO_2$ of 1 to 4 and containing approximately 7 molecules of water, under conditions producing loss of water, thereby preparing compounds having the composition $Na_2O.4SiO_2.xH_2O$, wherein $x$ is less than 7.

WALTER F. WEGST.
JOHN H. WILLS.